US012580950B2

(12) United States Patent
Hegde et al.

(10) Patent No.: US 12,580,950 B2
(45) Date of Patent: Mar. 17, 2026

(54) DYNAMICALLY RECALIBRATING MACHINE LEARNING MODEL PARAMETERS

(71) Applicant: Stripe Inc., South San Francisco, CA (US)

(72) Inventors: Chiranth Manjunath Hegde, San Francisco, CA (US); Michael Joseph Lin, San Francisco, CA (US); Yafu Li, San Francisco, CA (US); Andrew Kontaxis, San Francisco, CA (US); Maria Jose Gonzalez Bernardo, San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 18/752,490

(22) Filed: Jun. 24, 2024

(65) Prior Publication Data

US 2025/0392616 A1 Dec. 25, 2025

(51) Int. Cl.
*H04L 9/40* (2022.01)
*H04W 24/02* (2009.01)
(52) U.S. Cl.
CPC ......... *H04L 63/1441* (2013.01); *H04W 24/02* (2013.01)
(58) Field of Classification Search
CPC ........................... H04L 63/1441; H04W 24/02
USPC ........................................................ 726/23
See application file for complete search history.

(56) References Cited

U.S. PATENT DOCUMENTS

| | | | | |
|---|---|---|---|---|
| 9,942,103 | B2 * | 4/2018 | Branch | .................. H04L 43/55 |
| 11,496,501 | B1 * | 11/2022 | Liu | .......................... G06N 5/04 |
| 12,327,250 | B2 * | 6/2025 | Chen | ...................... G06N 20/00 |
| 2015/0379429 | A1 * | 12/2015 | Lee | ........................... G09B 5/00 |
| | | | | 706/11 |
| 2015/0379430 | A1 * | 12/2015 | Dirac | ...................... G06N 20/00 |
| | | | | 706/12 |
| 2020/0048992 | A1 * | 2/2020 | Williard | .................. E21B 41/00 |
| 2022/0358021 | A1 * | 11/2022 | Laskawiec | .......... G06F 11/3006 |
| 2023/0407731 | A1 * | 12/2023 | Allen | ...................... E21B 47/10 |
| 2024/0248452 | A1 * | 7/2024 | Winter | ................... H02P 23/14 |

(Continued)

FOREIGN PATENT DOCUMENTS

| | | | | | |
|---|---|---|---|---|---|
| CN | 110796477 | A | * | 2/2020 | ......... G06Q 30/0242 |
| WO | WO-2019025385 | A1 | * | 2/2019 | .......... G06F 21/552 |

*Primary Examiner* — Liang Che A Wang
(74) *Attorney, Agent, or Firm* — Foley & Lardner LLP

(57) ABSTRACT

Discussed herein are methods and systems for dynamically recalibrating machine learning model parameters. In one method, a server executes one or more prediction models to process network operations from various data feeds, in order to identify the likelihood of these operations being fraudulent or malicious. The server monitors performance data, such as the operation and execution metrics of network operations, and evaluates whether the performance values, like recall values, meet defined thresholds. If the performance data fails to meet these thresholds, the server employs a function-generation machine learning model to predict a threshold modification function. This modification function is then applied to adjust the relevant thresholds. Utilizing the modification function, the server dynamically revises one or more parameters of the prediction models to enhance their accuracy and efficacy.

20 Claims, 8 Drawing Sheets

(56) References Cited

U.S. PATENT DOCUMENTS

| | | | |
|---|---|---|---|
| 2025/0156772 A1* | 5/2025 | Rudraraju | G06Q 40/125 |
| 2025/0272692 A1* | 8/2025 | Chen | G06Q 20/4016 |
| 2025/0301004 A1* | 9/2025 | Herszfang | G06F 11/3034 |

* cited by examiner

Executing a first machine learning model configured to determine a first likelihood that a network operation corresponds to malicious activity and generate a malicious activity indication when the first likelihood satisfies a first threshold. 210

Executing a second machine learning model configured to determine a second likelihood that the network operation corresponds to a failure and generate a failure indication when the second likelihood satisfies a second threshold. 220

Executing a third machine learning model configured to determine a third likelihood that the network operation corresponds to a testing activity and generate a testing indication when the third likelihood satisfies a third threshold. 230

Identifying a recall value threshold associated with a computing infrastructure of a set of computing infrastructures. 240

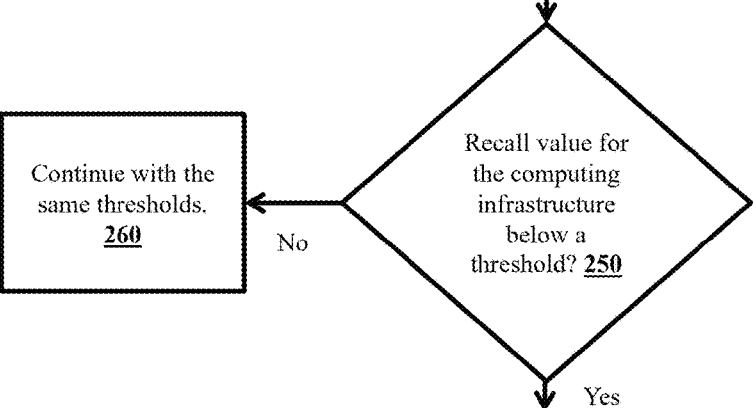

Continue with the same thresholds. 260

No

Recall value for the computing infrastructure below a threshold? 250

Yes

Executing a function-generation machine learning model to predict a threshold modification function to be applied to the first, second, or third threshold. 270

Dynamically revising the first, second, or third threshold in accordance with the threshold modification function. 280

FIG. 2

VISUAL DEPICTION OF NETWORK OPERATION DATA AND THRESHOLDS

VISUAL DEPICTION OF NETWORK OPERATION DATA AND THRESHOLDS

Figure 4:
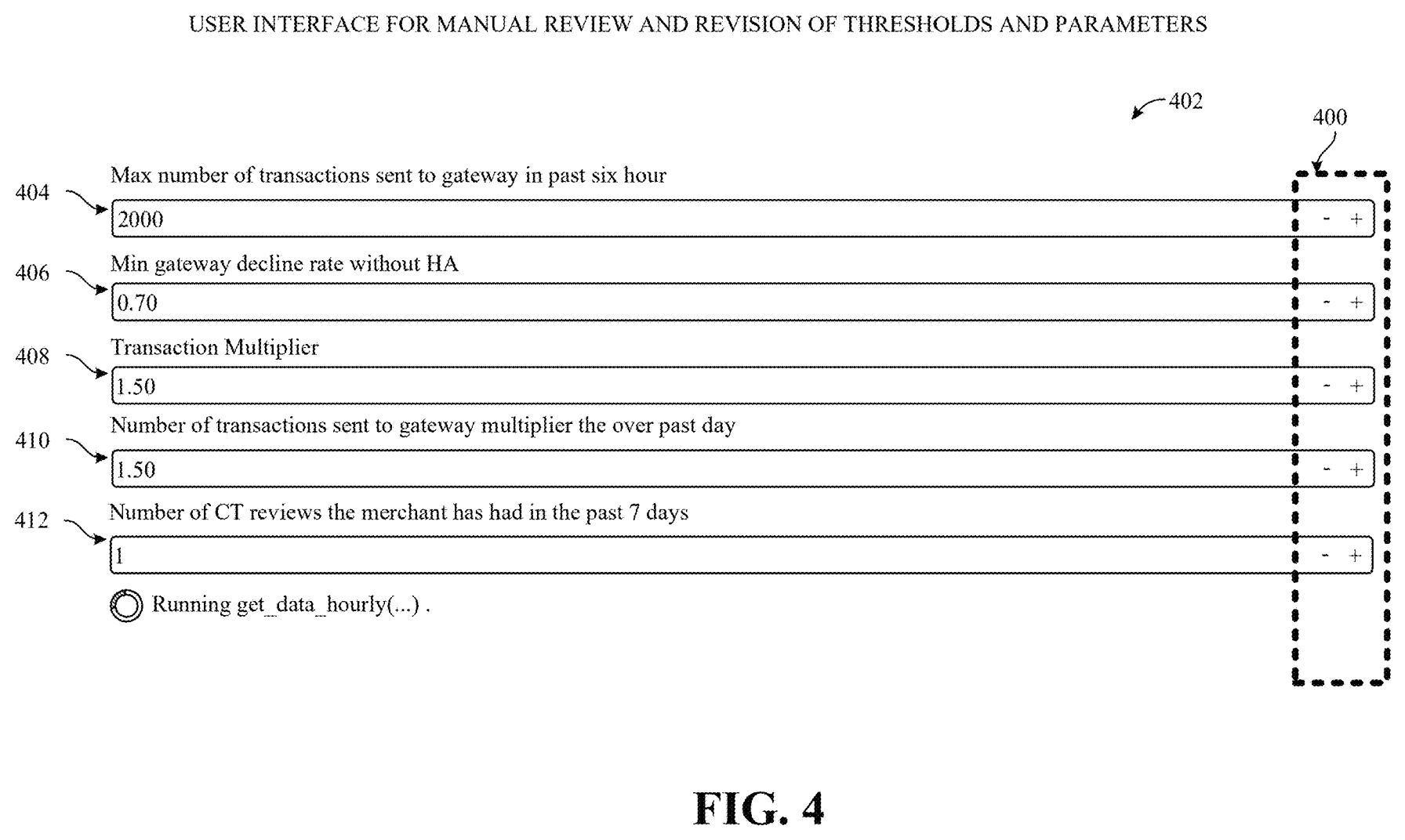

USER INTERFACE FOR MANUAL REVIEW AND REVISION OF THRESHOLDS AND PARAMETERS

400

402

Max number of transactions sent to gateway in past six hour 404    2000

Min gateway decline rate without HA 406    0.70

Transaction Multiplier 408    1.50

Number of transactions sent to gateway multiplier the over past day 410    1.50

Number of CT reviews the merchant has had in the past 7 days 412    1

Running get_data_hourly(...) .

DYNAMICALLY RECALIBRATING MACHINE LEARNING MODEL PARAMETERS

TECHNICAL FIELD

This application relates generally to methods and systems for dynamically recalibrating machine learning model parameters.

BACKGROUND

The rapid proliferation of advanced computing and digital technologies has led to the development of complex systems that involve interactions between various machine learning models, applications, and data sources. Such systems can be integral to managing and securing online transactions, where card testing activities often test the limits of the detection capabilities of the machine learning models. For example, machine learning models may be trained to identify patterns indicative of fraudulent activity by evaluating various network operation attributes. However, given the evolving tactics of fraud, machine learning models may not always effectively detect new or sophisticated fraud schemes. Accordingly, the system may incorporate additional analytical methods to improve the detection capabilities of the machine learning models.

SUMMARY

In order to identify fraudulent activity, many existing fraud detection systems use machine learning models. However, conventional machine learning models trained using conventional methods can face numerous technical challenges. Systems and methods using machine learning models for detecting fraudulent transactions rely on pre-defined workflows (and sometimes static thresholds) to access data from a single electronic data source and generate reports on potentially fraudulent activity associated with the computing infrastructure. These machine-learning models lack flexibility and may not adapt well to evolving fraud patterns or specific user needs all the time. For example, a static workflow may not dynamically select the most relevant data sources, or thresholds based on the specific characteristics of a suspicious network operation (e.g., transaction).

Such static thresholds may often fail to account for the unique risk profiles of individual computing infrastructures. For example, computing infrastructures with a history of legitimate low-value transactions can be mistakenly flagged for suspicious activity if their transaction behavior (e.g., example where a network operation or a transaction is card testing activity) falls outside the generic thresholds, leading to unnecessary interventions and disruptions to legitimate operations. Additionally, static thresholds can only initiate a limited set of predefined responses, such as low risk and high risk, that can prevent tailored responses to the severity of the card testing activity. For example, a computing infrastructure experiencing a minor card testing spike can be subjected to the same level of scrutiny as one undergoing a large-scale automated testing attack, which can result in overreactions or insufficient actions to effectively mitigate fraud risks.

Furthermore, using static thresholds in machine learning models can lead to inefficient resource allocation within fraud prevention teams. The constant stream of false positives triggered by computer models with low inherent risk can overwhelm analysts, diverting their attention away from genuinely suspicious activities. These limitations of static thresholds can hinder effective card testing detection and responses, leading to increased operational resources for fraud prevention measures.

The technical solutions described herein can use multiple prediction models to process network operations received through various data feeds. These prediction models can function as intelligent filters, analyzing each transaction and predicting its potential outcomes. For example, one prediction model can predict the likelihood of malicious activity, a second prediction model can predict the likelihood of the transaction being declined by an issuer, and a third prediction model can predict potential card testing activities. If the predicted probability for any category surpasses a predefined threshold, a corresponding indication may be generated, such as malicious activity, failure, or testing, depending on the implementation.

The technical solutions described herein do not rely solely on static thresholds. For example, the system can incorporate an additional layer of intelligence through a separate machine-learning model. This additional machine-learning model can be a function-generation machine learning model that can function as a dynamic threshold controller based on real-time data associated with online transactions. In this regard, the controller model can process network traffic characteristics (packet size, source/destination IP addresses), operation type (login attempt, data transfer), and historical context (previous attempts from the same source or a different one). By selecting and engineering these features, the system can identify subtle patterns that differentiate between legitimate and malicious activity or predict potential operational failures based on historical trends. Additionally, the machine-learning model can actively monitor the performance of each prediction model. For example, the machine-learning model can track metrics, such as accuracy, precision, and recall or performance values, to identify any degradation in the performance of any of the prediction models.

By incorporating various factors, as described above, the machine-learning model can generate a more holistic score or predict a threshold modification function for each network operation. This threshold modification function can be used to dynamically adjust thresholds associated with one or more prediction models and determine the appropriate intervention. For example, for network operations with consistently low-risk scores, the system may trigger minimal actions, such as logging the event for monitoring purposes. Operations exhibiting occasional suspicious patterns or exceeding thresholds for specific characteristics may receive warnings or temporary limitations. Operations with high-risk scores due to malicious activity indicators or significant deviations from normal behavior may face stricter actions, such as blocking or further investigation.

The machine-learning model can identify that different computing infrastructures may have varying levels of risk and operation patterns. For example, a large online retailer may desire different threshold settings compared to a small boutique store. The controller can adjust or recalibrate the fraud detection capabilities of one or more prediction models based on real-time data. For instance, if a surge in card testing is detected from a particular source, the machine-learning model can tighten the corresponding thresholds to prevent fraud, thereby reducing potential loss. During detected attacks or surges in suspicious activity, the machine-learning model can implement stricter controls to rapidly mitigate risk. In some cases, once the threat level decreases, the machine-learning model can relax the controls to prevent unnecessary declines of legitimate transactions. The machine-learning model can continuously adjust or recalibrate thresholds based on the feedback received from transaction outcomes and model predictions, aiming to optimize the balance between blocking fraudulent transactions and allowing legitimate ones.

Furthermore, the machine-learning model can process additional transaction characteristics, such as transaction amount, frequency, location, and time of day, among others, to identify network operations potentially indicative of card testing activity. Card testing is an emerging type of fraud where fraudsters use stolen or randomly generated credit card numbers to make small transactions, typically for a very low amount (e.g., a dollar), to verify if the card is active and can be used for larger transactions. If the small charge is successful, indicating that the card is valid, the fraudster will proceed to make larger fraudulent purchases. This process helps fraudsters identify working card numbers from a bulk list of stolen or generated ones. Card testing often involves automated scripts or bots that can quickly test large volumes of card numbers through online payment gateways. Traditional models, which rely on static thresholds, rules and delayed data processing, struggle with these subtle and sporadic patterns, especially across different computing infrastructures. The methods and systems discussed herein can allow for retrofitting existing computing infrastructure without the need to revise existing models, which is highly expensive and undesirable.

Using the methods and systems discussed herein, the machine learning model can be trained specifically for card testing activities. Therefore, "fraud," as used herein, may refer to card testing activity and not traditional fraudulent activity (e.g., overcharging a user).

In some embodiments, a system may comprise one or more processors configured to execute a malicious activity prediction model, an operation failure prediction model, and a testing activity prediction model for processing network operations obtained via one or more data feeds, wherein the malicious activity prediction model is configured to determine a first likelihood that a network operation corresponds to malicious activity and generate a malicious activity indication when the first likelihood satisfies a first threshold, wherein the operation failure prediction model is configured to determine a second likelihood that the network operation corresponds to a failure and generate a failure indication when the second likelihood satisfies a second threshold, and wherein the testing activity prediction model is configured to determine a third likelihood that the network operation corresponds to a testing activity and generate a testing indication when the third likelihood satisfies a third threshold; in response to determining that a recall value or a performance value for a computing infrastructure of a set of computing infrastructures fails to satisfy a recall threshold associated with the computing infrastructure in connection with processing the network operations: execute a function-generation machine learning model to predict a threshold modification function to be applied to the first, second, or third threshold; and in connection with processing a first network operation for the computing infrastructure via the malicious activity prediction model, the operation failure prediction model, and the testing activity prediction model, dynamically revise the first, second, or third threshold in accordance with the threshold modification function.

The system may comprise one or more processors configured to train the function-generation machine learning model to predict the threshold modification function using a training dataset comprising historical network operations associated with at least one computing infrastructure. The function-generation machine learning model may be trained to predict the threshold modification function corresponding to a timestamp associated with the network operation. The function-generation machine learning model may be trained to predict the threshold modification function corresponding to one or more network operations clustered in accordance with a likelihood of similarity in at least one attribute. The function-generation machine learning model may be trained to predict the threshold modification corresponding to an operational parameter of the computing infrastructure. The first model may be configured to determine the first likelihood of a first one of the network operation corresponding to malicious activity, failure, or the network operation corresponding to a testing activity, and the second model may be configured to determine the second likelihood of a different one of the network operation corresponding to malicious activity, failure, or the network operation corresponding to a testing activity.

In some embodiments, a method may include executing, by a processor, a first prediction model and a second prediction model for processing network operations obtained via one or more data feeds, wherein the first prediction model is configured to determine a first likelihood that a network operation corresponds to a first label and generate an indication of the first label when the first likelihood satisfies a first threshold, and the second prediction model is configured to determine a second likelihood that the network operation corresponds to a second label and generate an indication of the second label when the second likelihood satisfies a second threshold; in connection with processing the network operations, determining, by one or more processors, that performance data for a computing infrastructure of a set of computing infrastructures fails to satisfy a performance threshold associated with the computing infrastructure; and in response to a determination that the performance data fails to satisfy the performance threshold associated with the computing infrastructure: executing, one or more processors, a machine learning model to predict a threshold modification to be applied to the first or second threshold; and in connection with processing a first network operation for the computing infrastructure via the first and second models, dynamically revising, by one or more processors, the first or second threshold of the first or second prediction model in accordance with the threshold modification.

The method may include training, by the processor, the machine learning model to predict the threshold modification function using a training dataset comprising historical network operations associated with at least one computing infrastructure. The machine learning model may be trained to predict the threshold modification corresponding to a timestamp associated with the network operation. The machine learning model may be trained to predict the threshold modification corresponding to one or more network operations clustered in accordance with a likelihood of similarity in at least one attribute. The machine learning model may be trained to predict the threshold modification corresponding to an operational parameter of the computing infrastructure.

In some implementations, executing the machine learning model to predict the threshold modification may comprise executing the machine learning model to predict a threshold modification function to be applied to the first or second threshold. In some implementations, dynamically revising the first or second threshold of the first or second prediction model may comprise dynamically revising the first or second threshold of the first or second prediction model in accordance with the threshold modification function in connection with processing the first network operation for the computing infrastructure via the first and second models. The malicious activity prediction model may be configured to determine the first likelihood of a first one of the network operation corresponding to the malicious activity, the failure, or the testing activity, the operation failure prediction model is configured to determine the second likelihood of a different one of the network operation corresponding to the malicious activity, the failure, or the testing activity, and the testing activity prediction model is configured to determine the third likelihood of a different one of the network operation corresponding to the malicious activity, the failure, or the testing activity.

In yet another embodiment, a non-transitory machine-readable storage medium having computer-executable instructions stored thereon that, when executed by one or more processors, may cause the one or more processors to execute a first prediction model and a second prediction model for processing network operations obtained via one or more data feeds, wherein the first prediction model is configured to determine a first likelihood that a network operation corresponds to a first label and generate an indication of the first label when the first likelihood satisfies a first threshold, and the second prediction model is configured to determine a second likelihood that the network operation corresponds to a second label and generate an indication of the second label when the second likelihood satisfies a second threshold; in connection with processing the network operations, determine that performance data for a computing infrastructure of a set of computing infrastructures fails to satisfy a performance threshold associated with the computing infrastructure; and in response to a determination that the performance data fails to satisfy the performance threshold associated with the computing infrastructure: execute a machine learning model to predict a threshold modification to be applied to the first or second threshold; and in connection with processing a first network operation for the computing infrastructure via the first and second models, dynamically revise the first or second threshold of the first or second prediction model in accordance with the threshold modification.

The computer-executable instructions may further cause the one or more processors to train the machine learning model to predict the threshold modification function using a training dataset comprising historical network operations associated with at least one computing infrastructure. The machine learning model may be trained to predict the threshold modification corresponding to a timestamp associated with the network operation. The machine learning model may be trained to predict the threshold modification corresponding to one or more network operations clustered in accordance with a likelihood of similarity in at least one attribute. The machine learning model may be trained to predict the threshold modification corresponding to an operational parameter of the computing infrastructure.

In some implementations, executing the machine learning model to predict the threshold modification comprises executing the machine learning model to predict a threshold modification function to be applied to the first or second threshold. In some implementations, dynamically revising the first or second threshold of the first or second prediction model comprises dynamically revising the first or second threshold of the first or second prediction model in accordance with the threshold modification function in connection with processing the first network operation for the computing infrastructure via the first and second models. The first model may be configured to determine the first likelihood of a first one of the network operation corresponding to malicious activity, failure, or the network operation corresponding to a testing activity, and the second model may be configured to determine the second likelihood of a different one of the network operation corresponding to malicious activity, failure, or the network operation corresponding to a testing activity.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 2 illustrates a flowchart depicting operational steps for dynamically recalibrating machine learning model parameters, according to an embodiment.

FIG. 4 illustrates another implementation of a machine learning technique, according to an embodiment.

DETAILED DESCRIPTION

Figure 1:
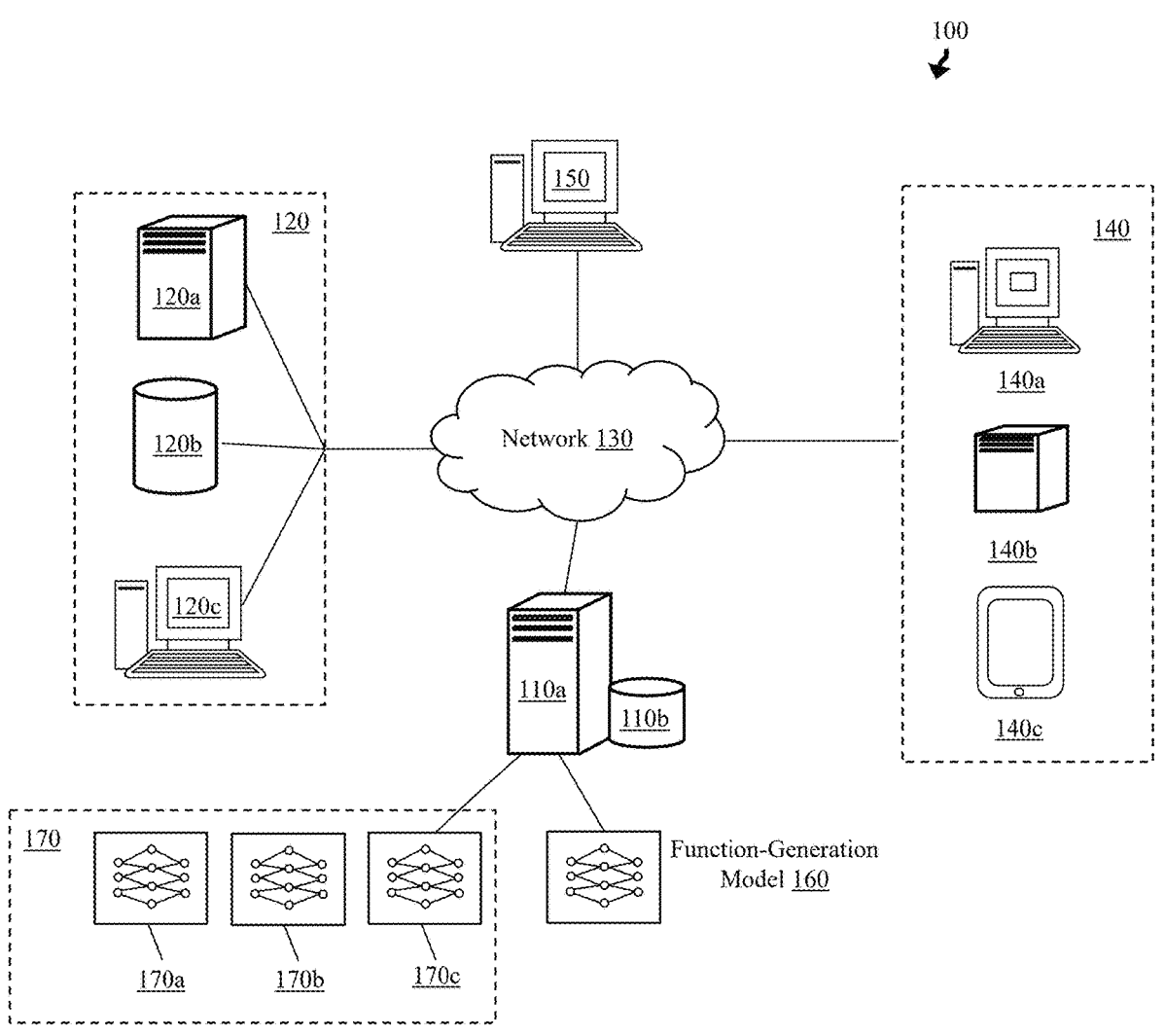
FIG. 1 illustrates a computing system for dynamically recalibrating machine learning model parameters, according to one or more embodiments.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 is a non-limiting example of components of a dynamic fraud detection system 100 in which an analytics server 110a operates. The analytics server 110a may utilize features described in FIG. 1 to process transaction data and recalibrate thresholds associated with one or more prediction models (can also be referred to herein as machine learning models for convenience) based on changing patterns associated with network operations.

The analytics server 110a may be communicatively coupled to a system database 110b, user devices 140a-c (collectively user devices 140), and an administrator computing device 150. The analytics server 110*a* may also use various computer models (e.g., the computer models 170*a-c*) to analyze the data. The computer models 170*a-c* (collectively, a computer model 170) can include one or more prediction models or machine learning models. For example, a first computer model 170*a* can include a first prediction model or machine learning model, a second computer model 170*b* can include a second prediction model or machine learning model, and a third computer model 170*c* can include a third prediction model or machine learning model, among others.

The analytics server 110*a* may also use various controlling models 160 (e.g., machine learning models) to control the thresholds associated with one or more prediction models or machine learning models. For example, the thresholds associated with one or more computer models 170 can be analyzed and/or dynamically recalibrated via function-generation machine learning model 160. In some implementations, even though the function-generation machine learning model 160 is depicted as a single model, it can be a collection of models itself. In some implementations, the function-generation machine learning model 160 can also be referred to as a computer model.

In some embodiments, for convenience, the first computer model 170*a* can be referred to as the first prediction model or machine learning model 170*a*, the second computer model 170*b* can be referred to as the second prediction model or machine learning model 170*b*, and the third computer model 170*c* can be referred to as the third prediction model or machine learning model 170*c*.

The system 100 is not confined to the components described herein and may include additional or other components not shown for brevity, which are to be considered within the scope of the embodiments described herein. The system 100 may also include other servers (not depicted), which serve to conduct allowance or blocking of future transactions responsive to dynamically recalibrating thresholds associated with one or more machine learning models 170 by the function-generation machine learning model 160

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

The analytics server 110*a* may be configured to receive data (e.g., data associated with a transaction) from various sources and process the associated transaction data using a machine-learning model (e.g., the computer model 170) to predict the likelihood of fraud. In some implementations, the analytics server 110*a* may be configured to control or operate the computer model 170 by recalibrating the thresholds associated with one or more prediction models or machine learning models. The analytics server 110*a* may receive the data directly from a user (e.g., the user subscribed to the subscription service performing the transaction), an entity (e.g., a bank, credit card company, or credit bureau, among others) result, or from another processor (not shown) associated with an electronic payment system. In some embodiments, a user or a computing infrastructure (e.g., a merchant) and/or a system administrator (operating the administrator computing device 150) may use a platform (hosted by the analytics server 110*a* or a third party) to transmit the request to the analytics server 110. The platform may include one or more graphical user interfaces (GUIs) displayed on the user device 140 and/or the administrator computing device 150. For instance, the platform may include various GUIs that depict trends and statistical information regarding different computing infrastructures and their respective fraudulent activities. For instance, the GUI may depict each merchant's number and trends associated with fraudulent activities.

An example of the platform generated and hosted by the analytics server 110*a* may be a web-based application or a website configured to be displayed on various electronic devices, such as mobile devices, tablets, personal computers, and the like. The platform may include various input elements configured to receive requests related to the transaction or the subscription service. For instance, a user may access the platform to initiate a transaction. Using the platform, the user may select the transaction to be processed and may provide a means of payment for the transaction.

The analytics server 110*a* may be any computing device comprising a processor and non-transitory, machine-readable storage capable of executing the various tasks and processes described herein. The analytics server 110*a* may employ various processors, such as a central processing unit (CPU) and graphics processing unit (GPU), among others. Non-limiting examples of such computing devices may include workstation computers, laptop computers, server computers, and the like. While the system 100 includes a single analytics server 110*a*, the analytics server 110*a* may include any number of computing devices operating in a distributed computing environment, such as a cloud environment.

The computer models 170 may represent a collection of various machine learning models or computer models that use algorithmic and/or artificial intelligence modeling techniques to process different transactions, predict the likelihood of fraud, and/or train each other. In some embodiments, different computer models 170 may be configured to determine different scores or thresholds using different methods and/or may be trained differently. For instance, the computer model 170*a-c* may be trained and calibrated to predict a transaction with a likelihood of being fraudulent (e.g., card testing). In some embodiments, the computer models 170*a-c* may be calibrated to determine a respective threshold corresponding to a respective attribute of a card testing activity or a network operation.

In some embodiments, the computer model 170 can include one or more models, including, but not limited to, a real-time card testing day model (RTCTDM), a card testing day model (CTDM), a validation to payment (VTP), a decline model (DM), and a card testing transaction level CTTX model, among others. The RTCTDM can be used to identify and predict card testing transactions in real-time. The CTDM can be used to determine whether a computing infrastructure (e.g., merchant) is going through card testing on a specific day. The VTP model can be used to predict whether a transaction will result in a charge within 35 days (or any other time window). The DM can predict transactions that should be blocked to prevent fraudulent activity. The CTTX model can identify card-testing transactions and predict whether a transaction is part of a fraudulent (e.g., card testing) attack. Similarly, the function-generation machine learning model 160 can incorporate one or more of the aforementioned machine learning models (e.g., RTCTDM, CTDM, VTP, CTTX, and/or DM), individually or in combination.

In some embodiments, the function-generation machine learning model 170 can predict a dynamic threshold function in response to determining that the recall value or the performance value threshold fails to satisfy a predetermined threshold, thereby causing an increase in the number of fraudulent transactions, rejection of legitimate transactions, or other attributes associated with network operations. In this regard, the first machine learning model 170a can be trained using the threshold dynamically recalibrated by the function-generation machine learning model 160 to improve its prediction of the likelihood that current or new transactions may correspond to suspicious activity. In some implementations, the second machine learning model 170b can be trained using the threshold dynamically recalibrated by the function-generation machine learning model 160 to improve its prediction of the likelihood that current or new transactions may be declined by an issuing computing infrastructure. In some implementations, the third machine learning model 170c can be trained using the threshold dynamically recalibrated by the function-generation machine learning model 160 to improve its prediction of the likelihood that current or new transactions may correspond to a card testing activity.

In some embodiments, a group of the computer models may belong to the same model. That is, in some embodiments, a single model may include various sub-models. Segmenting a single machine-learning model into different sub-models can be a powerful approach to tackling complex tasks, such as detecting fraud and determining metrics for the likelihood of a future transaction's success.

The electronic data sources used to generate the training dataset may be retrieved from various electronic data repositories (referred to herein as the electronic data sources 120). The electronic data sources 120 may include various merchant and electronic sources that store transaction data (including fraudulent transactions).

Computing infrastructures 140 may be any computing device comprising a processor and a non-transitory, machine-readable storage medium capable of performing the various tasks and processes described herein. Non-limiting examples of the computing infrastructure 140 are a workstation computer, Point of Sale system, laptop computer, phone, tablet computer, and server computer. During operation, various users may use the computing infrastructures 140 to conduct a transaction. Even though referred to herein as "user" devices, these devices may be operated by any party associated with a transaction, such as a merchant. For instance, a tablet 140c may be used by a computing infrastructure used on behalf of a merchant to conduct a sale. In another example, the computing infrastructures 140 may include a point-of-sale terminal or a card reader.

The administrator computing device 150 may represent a computing device operated by a system administrator. The administrator computing device 150 may be configured to monitor various attributes generated by the analytics server 110a (e.g., a suitable service provider or various analytic metrics (e.g., the scores or thresholds) determined during training of one or more machine-learning models and/or systems); monitor one or more computer models 160 and/or function generation models 170 utilized by the analytics server 110a and/or user devices 140; review feedback; and/or oversee the electronic data sources 120 communicated with by the analytics server 110a.

In operation, the analytics server 110a may receive data associated with a future or new transaction, including a user identifier, a transaction amount, and a payment identifier. Using the methods discussed herein, the analytics server 110a may train and/or execute the function-generation machine learning model 160 to predict a dynamic threshold function to be applied to the first, second, or third thresholds, or any combination thereof, associated with one or more prediction or computer models 170. In accordance with the threshold modification function, the analytics server 110a may dynamically revise one or more thresholds associated with different computer models 170 accordingly. The analytics server 110a may, upon determining that the transaction is fraudulent, instruct a second server to reject the transaction.

FIG. 2 illustrates a flow diagram of a process 200 executed by a dynamic fraud detection system 100 for dynamically recalibrating machine learning model parameters. The process 200 can include operations 210-280. However, other embodiments can include additional or alternative operations or can omit one or more operations altogether. The process 200 is described as being executed by a dynamic fraud detection system that is the same as, or similar to, the dynamic fraud detection system 100 described in FIG. 1. However, one or more operations of process 200 can also be executed by any number of computing devices operating in the distributed computing system described in FIG. 1. For instance, one or more computing devices (e.g., computing devices that can be the same as, or similar to, the analytics server) can perform some or all of the operations described in FIG. 2 alone or in cooperation with one or more other computing devices of FIG. 1. Using the methods and systems described herein, such as the process 200, the dynamic fraud detection system 100 can dynamically recalibrate thresholds of one or more prediction models or machine learning models based on changing patterns associated with network operations and use a function-generation machine learning model to predict a threshold modification function to be applied to the corresponding thresholds.

Using the method 200, the analytics server may execute a suite of models to determine whether a network operation corresponds to fraudulent activity. Specifically, the method 200 outlines three models that can be executed where each model identifies a different likelihood for the network operation. At step 210, the analytics server may execute a first machine learning model to predict whether a network operation is associated with a malicious entity. In order to make this determination, the first machine learning model may use a first threshold. At step 220, the analytics server may use a second machine learning model to predict whether the network operation corresponds to a failure (e.g., a transaction being declined by a card issuer). In order to make this determination, the second machine learning model may use a second threshold. At step 230, the analytics server may execute a third machine learning model to predict whether the network operation corresponds to a card testing activity. In order to make this determination, the third machine learning model may use a third threshold. Using a combination of the three machine learning models discussed above (steps 210-230), the analytics server may determine whether a network operation is fraudulent. The analytics server may concurrently monitor the network operation and evaluate the performance of the suite of machine learning models discussed herein. If the performance is below a threshold (steps 240-250), the analytics server may execute a function-generation machine learning model to dynamically revise the first, second, and/or third thresholds used by the suite of machine learning models.

At Step 210, the analytics server can execute a first prediction model. The first prediction model can correspond to a malicious activity prediction model configured to process transactions or network operations. For example, the malicious activity prediction model can process various data points associated with network operations, including the transaction amount, merchant information, location (physical location or IP address), and cardholder information, along with other data points depending on the implementation. Based on the data points, the malicious activity prediction model can calculate a fraud likelihood score (e.g., referred to as a first likelihood in this instance). In some implementations, the fraud likelihood score can indicate the probability (e.g., between 0 and 1) that the particular network operation is part of a broader spectrum of fraudulent or other malicious activities.

In some implementations, the malicious activity prediction model can compare the calculated score to a first threshold. The first threshold can be predefined. The first threshold can be a set value or percentage to indicate the level of suspicion associated with a transaction or a network operation. For example, if the fraud likelihood score is below the first threshold, indicating the transaction or network operation is less likely to be fraudulent or part of malicious activity, the malicious activity prediction model can generate an indication of a first label. In this instance, the first label can be referred to as having a low fraud risk. In some implementations, the malicious activity prediction model can generate a similar label, indicating a lower likelihood of fraud. In such implementations, when the fraud likelihood score is below the first threshold, the transaction data or data associated with the network operation can be passed on for further evaluation by other machine learning models. In some implementations, the transaction can be approved if additional checks pass.

In some implementations, where the fraud likelihood score is above the threshold, indicating a high likelihood of being fraudulent or malicious activity, the malicious activity prediction model can generate an indication of the first label. In this instance, the first label can be referred to as having a high fraud risk. In some implementations, the malicious activity prediction model can generate a similar label, indicating a higher likelihood of fraud. In such implementations, when the fraud likelihood score is above the first threshold, the malicious activity prediction model can flag the transaction or network operation for further scrutiny or reject the transaction outright to prevent potential fraud.

At Step 220, the analytics server can execute a second machine learning model. The second machine learning model can correspond to an operation failure prediction model configured to determine the likelihood of a network operation or a transaction corresponding to a failure, such as being declined by an issuer. In this regard, the operation failure prediction model can process transaction data or data associated with the network operation. In some implementations, the operation failure prediction model can process factors, such as the cardholder's past transaction behavior, the merchant's reputation, the geographic location of the transaction, and the time of day the transaction occurs, that may influence the issuer's decision to decline a transaction.

Based on the data points, the operation failure prediction model can calculate a decline likelihood score (e.g., referred to as a second likelihood in this instance). The decline likelihood score can indicate the probability (e.g., between 0 and 1) that the issuer may decline the transaction or network operation.

In some implementations, the operation failure prediction model can compare the calculated score to a second threshold. The second threshold can be predefined. The second threshold can be a set value or percentage that indicates the likelihood of the transaction being declined. For example, if the decline likelihood score is below the second threshold, indicating the transaction is less likely to be declined by the bank, the operation failure prediction can generate an indication of a second label. In this instance, the second label can be referred to as having a low risk of decline. In some implementations, the operation failure prediction model can generate a similar label, indicating a lower likelihood of issuer rejection. In such implementations, when the decline likelihood score is below the second threshold, the transaction or network operation can be passed on for further evaluation by other machine learning models or approved if additional checks pass.

In some implementations, where the decline likelihood score is above the second threshold, indicating a high chance of decline, the operation failure prediction model can generate an indication of a second label. In this instance, the second label can be referred to as having a high risk of decline. In some implementations, the operation failure prediction model can generate a similar label, indicating a higher likelihood of issue rejection. In such implementations, when the decline likelihood score is above the second threshold, the operation failure prediction model can flag the transaction or network operation for further scrutiny or decline the transaction or operation outright to prevent the customer's bank from potentially declining the transaction later.

At Step 230, the analytics server can execute a third machine learning model. The third machine learning model can correspond to a testing activity prediction model configured to detect card testing activities. In some implementations, the third machine learning model can be referred to as a card testing activity prediction model configured to encompass fraudulent and/or non-fraudulent activities. For example, the testing activity prediction model can process transaction data or data associated with a network operation. Based on the data points, the third machine learning model can calculate a testing likelihood score (referred to as a third likelihood in this instance). The testing likelihood score can indicate the probability (e.g., between 0 and 1) that the transaction or network operation is a card-testing activity or an attempt corresponding to the card-testing activity.

In some implementations, the testing activity prediction model can compare the testing likelihood score to a third threshold. The third threshold can be predefined. The third threshold can be a set value or percentage that indicates the likelihood of a transaction or network operation being a card-testing activity. For example, if the testing likelihood score falls below the third threshold, indicating the transaction or network operation is less likely to be a card testing activity, the transaction data or data associated with the network operation can be passed on for further evaluation by other machine learning models or approved if additional checks pass. In some implementations, if the testing likelihood score exceeds the third threshold, indicating the transaction or network operation is highly likely to be a card testing activity, the testing activity prediction model can flag the transaction for further scrutiny or reject the transaction outright to prevent potential fraud. In some implementations, the testing activity prediction model can be configured to generate an indication of a third label or a similar label, referred to as having a high likelihood of card testing activity or a low likelihood of card testing activity.

At Step 240, the analytics server can identify a recall value threshold (also interchangeably referred to as a performance value, indicating how effectively the server identifies actual fraudulent transactions) associated with a computing infrastructure or a set of computing infrastructures. For example, the analytics server can use one or more machine learning models, including malicious activity prediction, operation failure prediction, and testing activity prediction machine learning models, as well as other anomaly signals together with historical data and current activity patterns, to assess the overall performance in identifying actual fraudulent transactions or network operations corresponding to card testing activities or fraudulent transactions. For example, if there are 100 fraudulent transactions, a high recall value may indicate that the analytics server successfully identifies a significant portion of fraudulent transactions (e.g., 90%, or can be any positive integer), whereas a low recall value may indicate that the analytics server only identifies a small portion of fraudulent transactions (e.g., 10%, or can be any positive integer). In some implementations, a lower recall value may indicate a greater number of false positives. The recall value can be dynamically determined based on historical data or real-time conditions on the computing infrastructure. In some implementations, the recall value threshold can be a set value or percentage that indicates the minimum acceptable level for the recall metric, for example, determining how well the system performs in identifying actual or genuine fraudulent transactions.

At Step 250, the analytics server can identify whether the recall value for the computing infrastructure, such as a bank, a financial institution, or a merchant, falls below a threshold. The threshold can indicate the desired accuracy level for identifying fraudulent transactions or fraudulent network operations within the infrastructure. In this regard, the analytics server can compare the calculated recall value from Step 240 to the threshold. In some implementations, the threshold can be user-defined, allowing the user (e.g., merchant) to specify the desired accuracy level. For instance, the user can define an acceptable level of fraudulent transactions slipping through, such as by requiring the analytics server to provide at least a specific percentage (e.g., 90%) of the desired accuracy. In some implementations, the threshold can be a default threshold set by the system administrator based on general risk tolerance. For example, the default value can indicate an acceptable level of accuracy for most users. If the recall value falls below the threshold, this may indicate that the analytics server has failed to identify a significant number of suspicious or card-testing activities. In some implementations, if the recall value is below the threshold, this may indicate that the analytics server is overly cautious and has flagged a specified number of legitimate transactions or other network operations as fraudulent.

In some embodiments, the recall value may correspond to a false positive number of transactions. For instance, a computing infrastructure associated with a particular merchant may desire to have a low (e.g., below 10%) false positive transaction detection. Using one or more of the machine learning models discussed herein (steps 210-230), the analytics server may determine the likelihood of fraud associated with the transactions/network operations associated with the computing infrastructure. When the transactions are actually conducted, they may or may not be rejected by other computing systems (e.g., card issuers or other entities). The analytics server may compare the actual number of faulty/fraudulent transactions with the predicted (using the models discussed in the steps 210-230) to determine the value of false positives. This value may be referred to herein as the recall value. Then, the analytics server may determine whether the actual value is higher or lower than the merchant-identified threshold (e.g., 10%).

In some implementations, where the recall value satisfies or exceeds the threshold, this may indicate that the analytics server is effectively identifying suspicious or fraudulent transactions. In some implementations, the recall value satisfying or exceeding the threshold may indicate a lower percentage of false positives. In this regard, the analytics server can proceed with the same thresholds as indicated in Step 260.

In some implementations, where the recall value falls below the threshold, indicating an increase in the number of false positives or actual fraudulent network operations, the analytics server can initiate Step 270. At Step 270, the analytics server can execute a function-generation machine learning model that can predict a threshold modification function to be applied to the first, second, or third thresholds associated with different prediction models described in steps 210-230. The function-generation machine learning model can consider various factors, such as historical data and current activity patterns, to predict how the existing thresholds associated with different prediction models are to be recalibrated. In some implementations, the function-generation machine learning model can predict adjustments such as increasing, decreasing, or making other changes to the thresholds. For instance, the function-generation machine learning model can predict the desire to lower or raise the thresholds of the first, second, and third prediction models, or any combination thereof, to reduce false positives, identify more actual fraudulent transactions, or enhance card testing protection, among others.

At Step 280, following the predictions from Step 270, the analytics server can dynamically recalibrate the thresholds associated with different prediction models based on the threshold modification function predicted by the function-generation machine learning model. The analytics server can recalibrate the first threshold to improve the sensitivity of the malicious activity prediction model, recalibrate the second threshold to improve the sensitivity of the operation failure prediction model and recalibrate the third threshold to improve the effectiveness of the testing activity prediction model. In some implementations, the recalibration can involve raising, lowering, or maintaining the current thresholds to optimize the performance of each prediction model according to the predicted threshold.

In some implementations, to improve the functioning of the function-generation machine learning model, the analytics server can train the model. In this regard, the function-generation machine learning model can be configured to learn data from various training datasets. In some implementations, the training datasets for the function-generation machine learning model can include past transaction information, both fraudulent and legitimate, performance metrics such as the recall value from Step 240, and the values of the first, second, and third thresholds used in different transactions. In some implementations, the training datasets can include historical network operations associated with at least one computing infrastructure, such as a bank, a financial institution, or a merchant.

In some implementations, the analytics server can (before the execution of the function-generation machine learning model) train the function-generation machine learning model that can incorporate various factors into the dynamic threshold prediction process. For example, the function-generation machine learning model can consider the time-stamp associated with the network operation to adjust or recalibrate thresholds differently depending on the time of day, week, or year. In some implementations, the function-generation machine learning model can be trained on clusters of network operations based on their similarity in specific attributes, such as transaction amount or location, to provide recalibrations based on transaction types. In some implementations, the function-generation machine learning model can consider the operational parameters of the computing infrastructure itself, for example, a recent security breach in computing infrastructure may desire more aggressive thresholds. Based on the data points, the function-generation machine learning model can learn to predict a dynamic threshold value to determine the net effect of the adjustments on the corresponding thresholds. In some implementations, the dynamic threshold value can indicate a single adjustment value that is applied proportionally to all thresholds.

Using the methods and systems allows for a significant technical advantage by enabling seamless retrofitting into existing payment processing infrastructures and utilizing current machine learning models. The function-generation machine learning model can functionally control one or more existing models without requiring a complete overhaul, retraining, and/or revising of the existing system. Therefore, the methods and systems discussed herein allow the new system to quickly and efficiently augment the existing infrastructure, providing improved fraud detection capabilities while maintaining operational continuity.

In a non-limiting example, the training of the function-generation machine learning model may be tailored towards a particular category of computing infrastructures. For instance, if a computing infrastructure represents a small merchant (e.g., payment volume below $10 MM), the function-generation machine learning model may be trained using a similar cohort of computing systems. In this way, the revisions to one or more thresholds may be tailored for the small merchant, as the small merchant is assumed to behave differently than a large merchant having payment volume greater than $100 M. Using this training paradigm, technical efficiencies can be created because the same suite of models (e.g., models 170 discussed in FIG. 1) can be used for all computing infrastructures and merchants regardless of their size, as the thresholds used by the models 170 can be dynamically adjusted using thresholds that are tailored toward each computing system.

In some embodiments, using the methods and systems discussed herein, the analytics server may provide a dashboard that includes various metrics associated with the network operations discussed herein. For instance, the dashboard may include various charts providing metrics associated with transactions being conducted where the transactions are limited to a particular computing system. The dashboard may be updated in real-time or near-real-time, such that the user (e.g., an administrator of each computing infrastructure) may monitor the transactions and their respective metrics in real time. Using the dashboard, the administrator may revise one or more thresholds discussed herein. For instance, a user may revise the thresholds or other metrics discussed in steps 240/250 of FIG. 2.

Figure 3A:
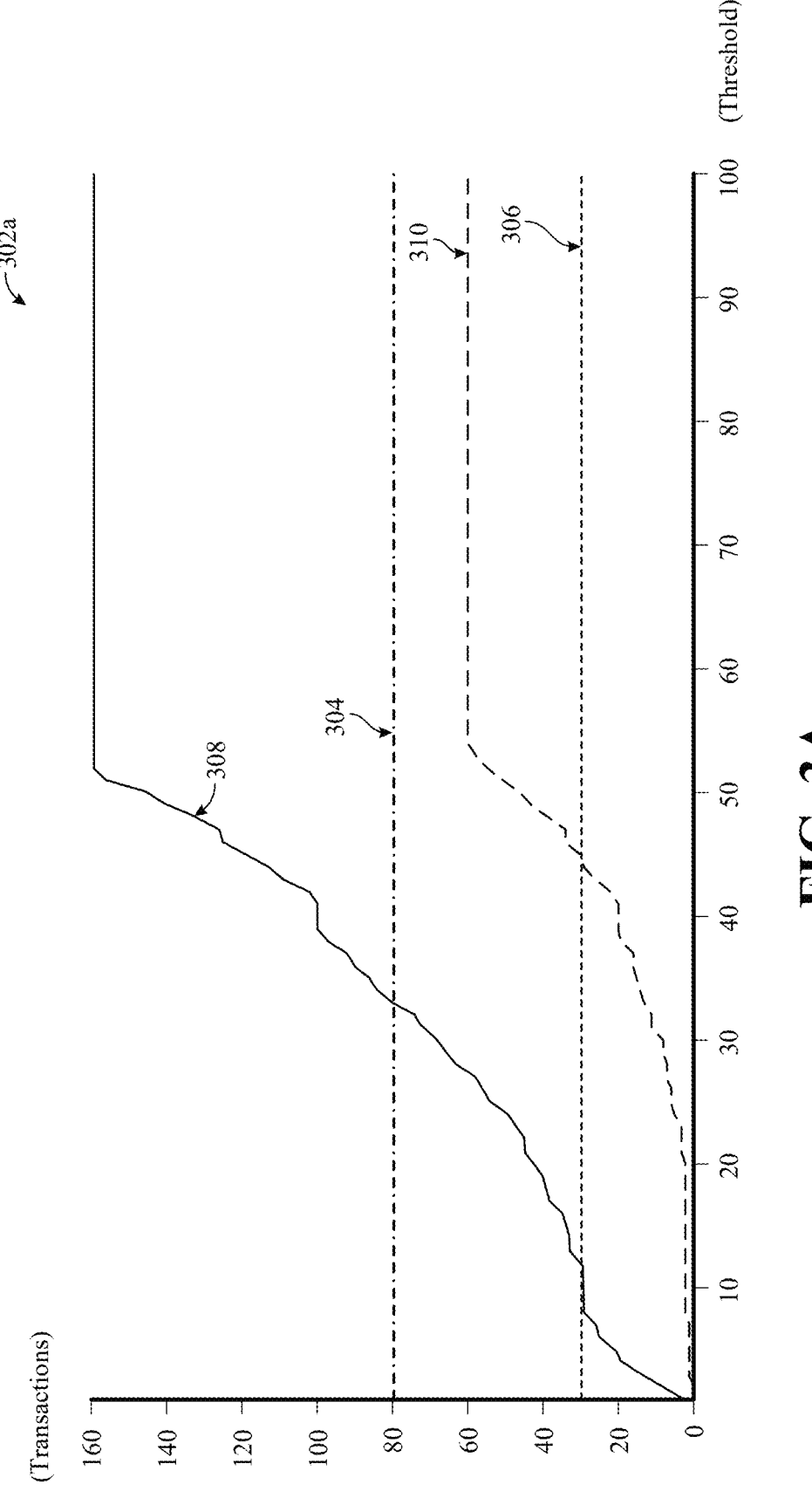
FIGS. 3A-3C illustrate an implementation of a machine learning technique, according to an embodiment.

Referring now to FIG. 3A, a graphical representation 302a illustrating network operations associated with a computing infrastructure is depicted (visual depiction of network operation data and thresholds). In some embodiments, the graphical representation 302a may be displayed on the dashboard discussed herein and tailored toward a particular computing infrastructure (e.g., only show transaction data of a particular merchant). Using the graphical representation 302a, the user may view trends associated with the transactions and visually identify whether the transactions satisfy various thresholds discussed herein. As a result, the user may use the function-generation machine learning model to revise the thresholds and change the transaction trends.

In the graphical representation 302a, the X-axis may represent the model threshold that can be adjusted or customized. The Y-axis may represent the transaction and decline counts to compare the actual transaction data with the target/capped values.

The graphical representation 302 can be used to determine whether the transactions allowed (e.g., approved) by the analytics server exceed a threshold. For instance, a line 308 may represent the actual number of transactions allowed. In some implementations, the line 308 may be referred to as a capped allowed transaction count, functioning as a marker for the upper limit of transactions (or network operations) that can be permitted. In some implementations, the line 308 may be adjusted or recalibrated in real-time or periodically such that the computing infrastructure 300 (which represents the computing infrastructure whose data is used to generate the graphical representation 302a) stays within the risk parameters. In some implementations, the analytics server can dynamically set the maximum number of allowed transactions to prevent exceeding the risk tolerance. In some implementations, where the actual number of allowed transactions reaches the capped limit, the analytics server can execute the function-generation machine learning model to predict and recalibrate the thresholds associated with various prediction models, as described in Steps 250-280.

The graphical representation 302 can be used to determine whether the transactions declined by the analytics server exceed a threshold. For instance, a line 310 may indicate the actual number of declined transactions. In some implementations, the line 310 can be referred to as a capped issuer declined transaction count, functioning as a marker for keeping the actual number of declined transactions within an optimal range. The line 310 may be recalibrated in real-time or periodically to optimize transaction conversion rates and prevent unnecessary financial disruptions. In some embodiments, where the actual number of declined transactions reaches a maximum limit for a specific computing infrastructure, the analytics server can execute the function-generation machine learning model to predict and recalibrate thresholds associated with various prediction models, as described in Steps 250-280.

The graphical representation 302 can be used to visually identify whether a desired recall value has been satisfied. For instance, a line 304 may indicate the recall value threshold explained in Step 240/250. That is, the line 304 may indicate the recall value desired by the user for the computing infrastructure. In this particular example, the line 304 may represent an initial number of transactions expected to be allowed by the analytics server with respect to the total number of transactions. For instance, the line 304 may correspond to a merchant's desire to cap the transactions predicted to be fraudulent (or sometimes all transactions) to 80%.

In some implementations, the line 304 may be referred to as a target transaction count, indicating the desired number of transactions expected to be allowed based on the recall value. In some implementations, the desired number of allowed transactions can be calculated as the mean plus three standard deviations (mean+3 standard deviations) of historical transaction data to cover approximately 99.7% of transactions, assuming a normal distribution. In some implementations, the line 304 can function as a benchmark for evaluating the performance of the suite of prediction models discussed herein.

In some embodiments, the user may desire to visualize multiple thresholds or recall values. The graphical representation 302 may allow for multiple thresholds to be shown at the time. For instance, a line 306 can indicate an initial number of transactions expected/desired to be declined by the analytics server. Therefore, the line 306 may also represent the recall value threshold discussed in Step 240/250. In some implementations, the line 306 can be referred to as a target issuer decline count, indicating an estimation of transactions expected/desired to be declined over a specific day or time period by a particular computing system or a prediction model. In some implementations, the line 306 can provide acceptable bounds to avoid excessive false positives.

The graphical representation 302a can be a part of a dashboard displayed on a computing device of a system administrator (e.g., administrator computing device 150 discussed in FIG. 1) and can be updated in real-time or near-real-time. Using the graphical representation 302a, an administrator can monitor how the suite of machine learning models discussed herein are performing with regard to various network operations. Therefore, using the dashboard discussed herein provided technical advantages by allowing for real-time monitoring and visual depiction of complex network operations.

Figure 3B:
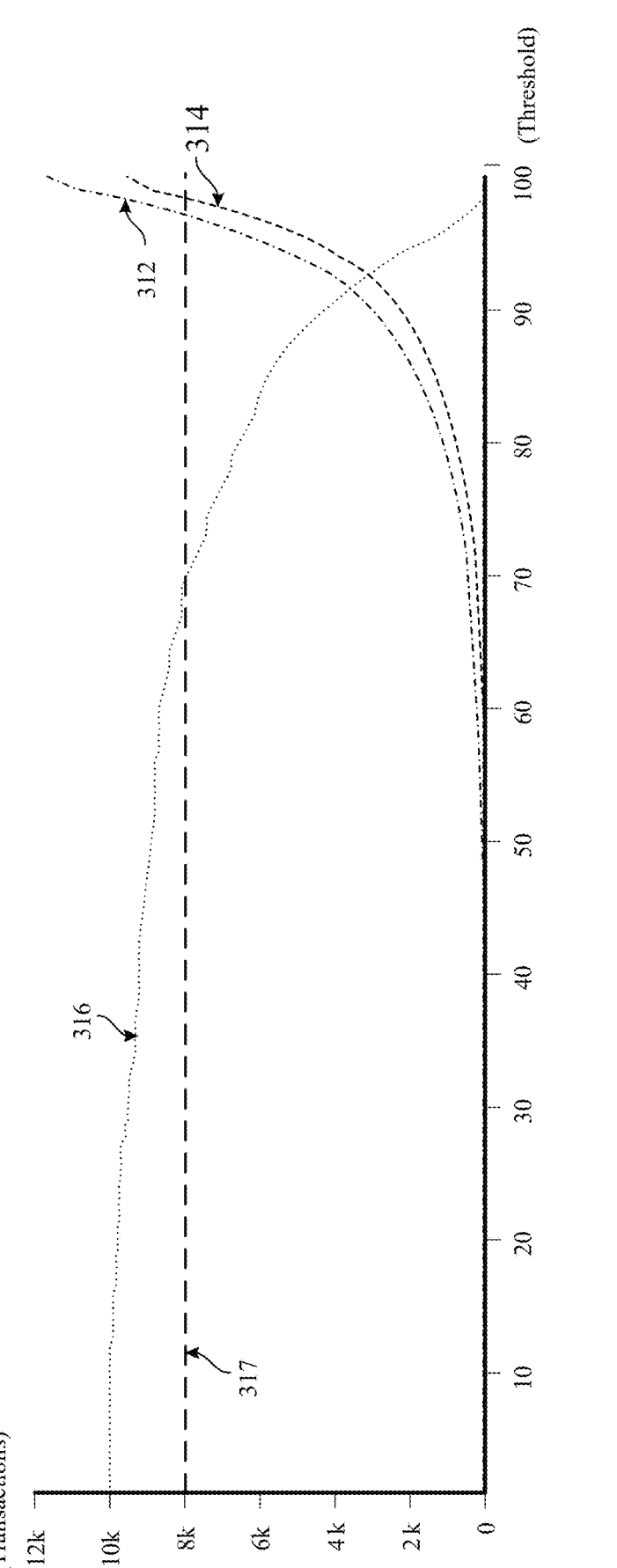

In some embodiments, the analytics server may provide a graphical representation of the network operations that can visually depict trends associated with the transactions being conducted in relation to a specific metric of the machine learning models discussed herein (e.g., false positive rate). Using this graphical representation allows the user/administrator to easily and quickly identify whether a metric exceeds a desired threshold. For instance, FIG. 3B depicts another graphical representation 302b illustrating a visual depiction of network operations identified as false positives in relation to a threshold.

As depicted, the X-axis may represent the model threshold that can be adjusted or customized, and the Y-axis may represent the charge volume of card testing. Line 312 (sometimes referred to as raw_allowed_txn_count) can indicate a raw count of transactions that have been approved over time. Line 314 (sometimes referred to as raw_target-_issuer_decline_count) can indicate a raw count of transactions that have been declined over time (e.g., declined by the card issuer). The graphical representation 302b may also be a part of the dashboard and used to visually identify whether a threshold (in this example, the false positive rate) has been corrected using the function-generation machine learning model.

In some implementations, the graphical representation 302b can indicate a false positive rate of network operations associated with a particular computing system. For instance, Line 316 (sometimes referred to as fpr_bps) can indicate the transactions that have been incorrectly declined with respect to the recall value threshold explained in Step 240 of FIG. 2. In this example, the line 316 shows an exponential decrease until the line 316 reaches a specific charge volume (e.g., 8 k) on the Y-axis, indicating that the number of false positives has hit a capped threshold (represented by the line 317).

In some implementations, where the number of false positives reaches a specific threshold with respect to the recall value threshold, the analytics server can execute the function-generation machine learning model to predict and recalibrate thresholds associated with various prediction models, as described in Steps 250-280. For instance, as depicted, when the line 316 is identified to be higher than a desired threshold, the function-generation machine learning model discussed herein can dynamically revise one or more thresholds discussed herein, such that the amount of false positive declines, as depicted. The graphical representation 302b may be updated in real-time, such that the user can view whether the function-generation machine learning model is operating correctly. For instance, the line 316 (false positive rate) is clearly above the threshold set by the user (represented by the line 317). However, the function-generation machine learning model may revise one or more parameters of the suite of machine learning models used to evaluate the network operation, such that the false positive rate is decreased and the actual number of approved transactions is increased, as depicted. Using the graphical representation 302b, the user may monitor and ensure whether the false positive rate has been addressed.

Using the methods and systems discussed herein, the function-generation (machine learning) model can functionally control the operations of the other computer models (e.g., machine learning computer models) discussed herein. Technical advantages are created because the aggregation of models can account for cyber-attacks or other time-sensitive problems much faster than conventional systems and/or human inventions. For instance, the function-generation (machine learning) model may account for spikes and cyber-attacks in real-time or near-real-time, which is merely impossible for a human to perform. Many sophisticated attackers may attempt to overwhelm the system by providing a cluster of fraudulent requests at the same time or otherwise during a short period of time (e.g., DDOS paradigm). In this way, the attackers attempt to overwhelm the computing system and the analytics server. Using conventional methods and systems that use conventional and static parameters, the computing system and/or the analytics server will succumb to the cyberattack by allowing several fraudulent requests before the parameters can be adjusted. However, using the methods and systems discussed herein, these attacks can be identified and even visualized in real-time or near real-time. Moreover, various thresholds and parameters can be adjusted (also in real-time or near real-time) to combat these cyber-attacks more efficiently, thereby providing technical advantages when compared to conventional systems.

Figure 3C:
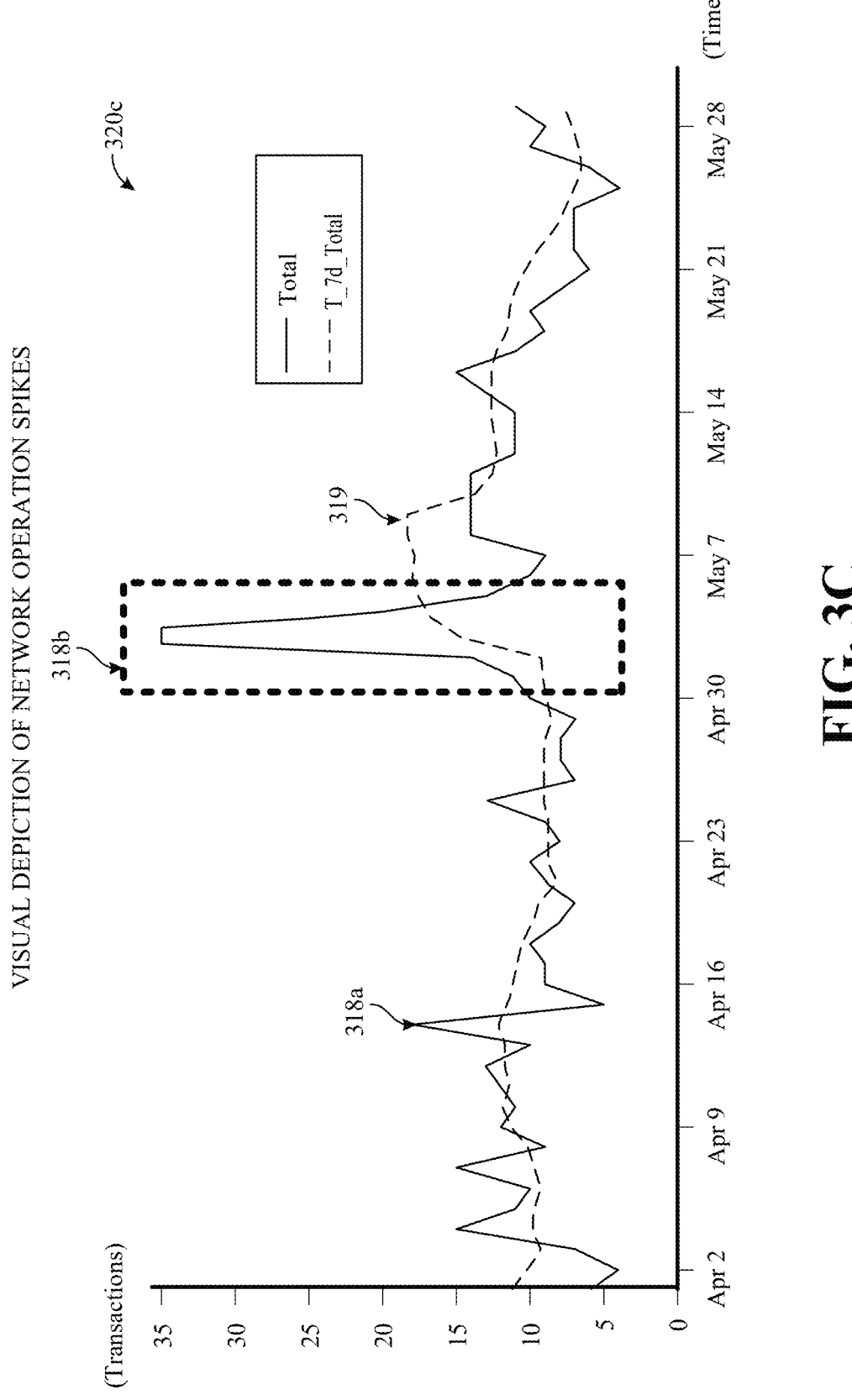

The dashboard discussed herein can also include a graphical representation of a spike with respect to the network operations. For instance, FIG. 3C is a visual depiction of network operation spikes. In a non-limiting example, the spike visualized in FIG. 3C may represent a non-limiting example of a cyber-attack in which the attackers create a spike in fraudulent activity. The graphical representation 302c also illustrates the potential burden (e.g., computing resources used) caused by card testing attempts. In the graphical representation 302c, the X-axis may represent a particular time period. The depicted embodiment illustrates a two-month window. However, other embodiments may show other time windows. The time window can be further segmented into weeks or days, depending on the granularity of the data. The Y-axis may represent the volume of card testing transactions, which can be expressed in terms of a number of transactions. Alternatively, the volume may be expressed in terms of percentages and not numbers.

The graphical representation 302c may include line 318a, which indicates the daily count of the computing system's total card testing transactions, and line 319, indicating a rolling time window's card testing transactions for a comparable time window (e.g., last week's transactions). A spike in this metric can indicate a sudden increase in the number of users conducting high volumes of card testing transactions, potentially requiring additional scrutiny. For instance, the line 318 may indicate a spike between April 30$^{th}$ and May 7$^{th}$ (spike 318b). This increase in activity is also identified as a spike because it is significantly higher than the rolling average (line 319). This spike indicates that there might have been a cyber-attack or a concerted effort to conduct a large cluster of card testing activities during that time. The graphical representation 302c may also be a part of the dashboard discussed herein. The data depicted in FIG. 3C refers to historical data. However, in some embodiments, the data may be depicted in real-time or near-real-time. For instance, the user may view whether card testing transactions are occurring in real-time. Using this information, the user may revise one or more thresholds discussed herein.

Among other efficiencies created using the methods and systems discussed herein, the analytics server can allow for an on-the-fly mechanism for the function-generation machine learning model to combat spikes of undesired network operations. For instance, when spikes occur, the function-generation machine learning model can revise one or more thresholds, such that the network operations are executed efficiently. For instance, when a spike in the total number of transactions is identified, the analytic server may automatically perform the method 200, such that the function-generation machine learning model corrects one or more parameters used by other machine learning models. In some embodiments, the analytics server may notify the computing infrastructure that a spike in transactions is occurring, thereby prompting the computing infrastructure (e.g., an administrator of the computing infrastructure) to manually revise one or more thresholds used herein. Referring now to FIG. 4, a non-limiting example of a prompt used to receive inputs from a system administrator is depicted.

Referring now to FIG. 4, depicted is a user interface 402 configured to provide graphical elements for manual review and/or revision of one or more thresholds/metrics during incidents such as card testing attempts or attacks. Accordingly, the user interface 402 may be used for manual review and revision of thresholds and parameters discussed herein. The user interface 402 may include various interactive elements 400 allowing the user to input their desired metrics and thresholds. In some embodiments, the dashboard may display the user interface 402, such that the user can view numerical metrics associated with the network operations.

In this regard, a graphical element 404 may display (and/or receive user inputs associated with) a maximum number of transactions within a specific timeframe to be sent to a gateway (e.g., to be analyzed) using the method 200. For instance, the graphical element 404 may depict a maximum number of transactions sent to gateway (e.g., analyzed by the function-generation machine learning model) in the past six hours. As used herein, a gateway may refer to an intermediary to manage electronic transactions. In some embodiments, if a computing infrastructure exceeds this threshold, the analytics server may trigger further investigation or execute one or more automated actions. The user may interact with the graphical element 404 (and its interactive element 400) to revise the number of transactions that can be used to define a spike. For instance, the user may increase or decrease the number of transactions.

Another graphical element 406 may display (and/or receive user inputs associated with) the minimum acceptable decline rate for transactions by the gateway without requiring human intervention (Min Gateway Decline Rate Without HA). The user may use the graphical element 406 (and its interactive element 400) to revise/define a desired decline rate.

The user interface 402 may include a graphical element 408 associated with a transaction multiplier. Using this graphical element, the user can dynamically scale the analytics server's response based on fluctuations in transaction volume. For example, a higher multiplier may be applied during peak transaction periods to account for expected increases. The user interface 402 may include a graphical element 410 (referred to as the "Number of Transactions Sent to Gateway Multiplier Over the Past Day"). Using this graphical element, the user may view/revise a ratio of transactions to be evaluated using, e.g., the method 200. In some embodiments, a significant increase in this value may indicate a spike in unusual activity, such as fraudulent (e.g., card testing) transactions. Another graphical element 412 may be configured to display (and/or receive input associated with) the frequency of manual fraud reviews for a computing infrastructure's transactions over the past week (though the time window can be adjusted by the user). For example, a high number of reviews may indicate suspicious activity associated with that specific computing infrastructure.

Figure 5:
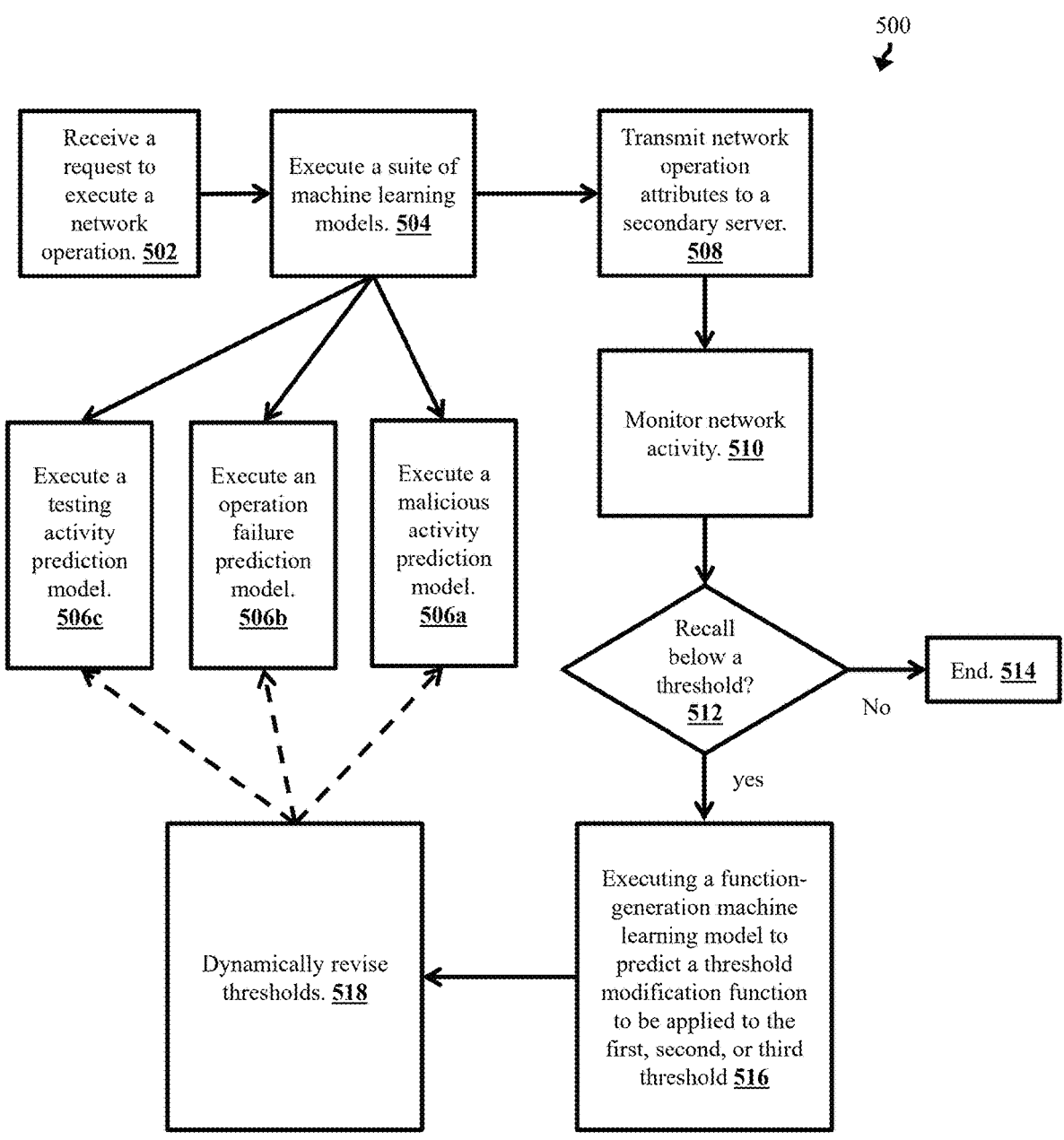
FIG. 5 illustrates a non-limiting example of the operation executed in a dynamically recalibrating machine learning model parameters, according to an embodiment.

FIG. 5 depicts a non-limiting example of a flow diagram of a process 500 executed in a system, such as the system 100 discussed in FIG. 1. The process 500 includes steps 502-518. However, other embodiments can include additional or alternative operations or can omit one or more operations altogether. The process 500 is described as being executed by the analytics server discussed in relation to the dynamically recalibrating machine learning model parameter system. However, one or more operations of process 500 can also be executed by any number of computing devices operating in the distributed computing infrastructure described in FIG. 1. The process 500 is a non-limiting example of the implementation of the method 200 and does not deviate from the scope of the method 200.

The process 500 starts with step 502, in which a processor, such as the analytics server 110a discussed in FIG. 1, receives a request to perform (or otherwise facilitate) a network operation. As discussed herein, the analytics server may receive various requests to perform various network operations from different computing systems/infrastructures. In this example, a computing infrastructure may transmit a request to perform a network operation. The request may include various attributes (e.g., IP address, payment card, customer attributes, and the like). In some embodiments, the analytics server may receive a stream of requests from different computing infrastructures and may execute the process 500 for each computing infrastructure.

In response to receiving the request, the analytics server may execute a suite of machine learning models to determine whether the network operation will cause a technical problem for the computing infrastructure. In this non-limiting example, the analytics server may determine whether the attributes received in the step 502 indicate a likelihood of card testing malicious activity. As discussed herein, card testing activity is a type of fraudulent activity that can unduly inappropriately divert the computing resources of a computing intrastate.

In order to analyze the request, the analytics server may execute one or more of the suite of machine learning models 506*a-c*. The suite of machine learning models may refer to the machine learning models discussed herein, e.g., in FIG. 1 (models 170) or FIG. 2 (steps 210-230). For instance, the suite of machine learning models 506*a-c* may include one or more of the RTCTDM, CTDM, VTP, DM, and/or CTTX models discussed in FIG. 1. In the step 504, the analytics server may execute one or more of the machine learning models and determine a likelihood of fraud using the attributes of the requests received in the step 502. Specifically, the analytics server may execute a malicious activity prediction model (506*a*) to determine whether the request is associated with a malicious entity. The analytics server may use a failure prediction model (506*b*) to determine whether the request will be denied by another entity (e.g., the card issuer or the secondary server). The analytics server may also use a card-testing activity prediction model (506*c*) to determine whether the request corresponds to a card-testing activity.

Each model discussed herein may use a respective threshold to determine whether the request corresponds to malicious activity, failure, and/or card testing. For instance, the malicious activity model may first determine a likelihood of the request corresponding to a malicious activity and then compare the likelihood to a threshold. Therefore, each model within the suite of machine learning models 506*a-c* may utilize a threshold.

After evaluating the request using the suite of machine learning models 506*a-c*, the analytics server may transmit the request for the network operation to a secondary server (step 508). For instance, in examples where the network operation is conducting a transaction, the analytics server may transmit the transaction attributes to a card issuer computing system, such that the payment is facilitated. In some embodiments, the analytics server may only transmit requests that satisfy a likelihood threshold to the secondary server. In some embodiments, the analytics server may perform the network operation itself without using the secondary server.

While the network operation is being performed, the analytics server may also monitor the performance of the network operation (step 510). For instance, the analytics server may monitor and determine whether a transaction request that was identified as likely to be card testing has actually been denied by a card issuer computing system as a potential card testing transaction. Therefore, by monitoring the actual transactions, the analytics server may determine the actual status of each network operation. The analytics server may then compare the values predicted using the suite of machine learning models 506*a-c* to the actual value. For instance, the suite of machine learning model 506*a-c* may predict that a transaction will be declined by the secondary server. However, the secondary server does not decline the transaction.

Using this comparison, the analytics server may calculate a recall value or a performance value for the network operation. For instance, if the suite of machine learning models 506*a-c* identifies a transaction as card testing but the transaction is actually accepted by a card issuer computing system, the analytics server may designate that transaction as a false positive. Therefore, the percentage of the false positive transactions may be considered the recall value.

In step 512, the analytics server may determine whether the recall value is below a threshold. As discussed herein, the threshold may be a default threshold or may be received from a merchant/computing infrastructure. If yes (step 514), the process 500 may end. If the recall value is above the threshold (step 516), the analytics server may execute the function-generation machine learning model that can predict a modification to be applied to one or more parameters of the suit of machine learning models 506*a-c*. Subsequently, the analytics server may dynamically revise the thresholds used by one or more of the models within the suite of machine learning models 506*a-c* in step 518.

For instance, if a false positive value (for the card testing prediction model) for a series of transactions is higher than 70%, the function-generation machine learning model may revise the threshold used by the card testing prediction model.

Figure 6:
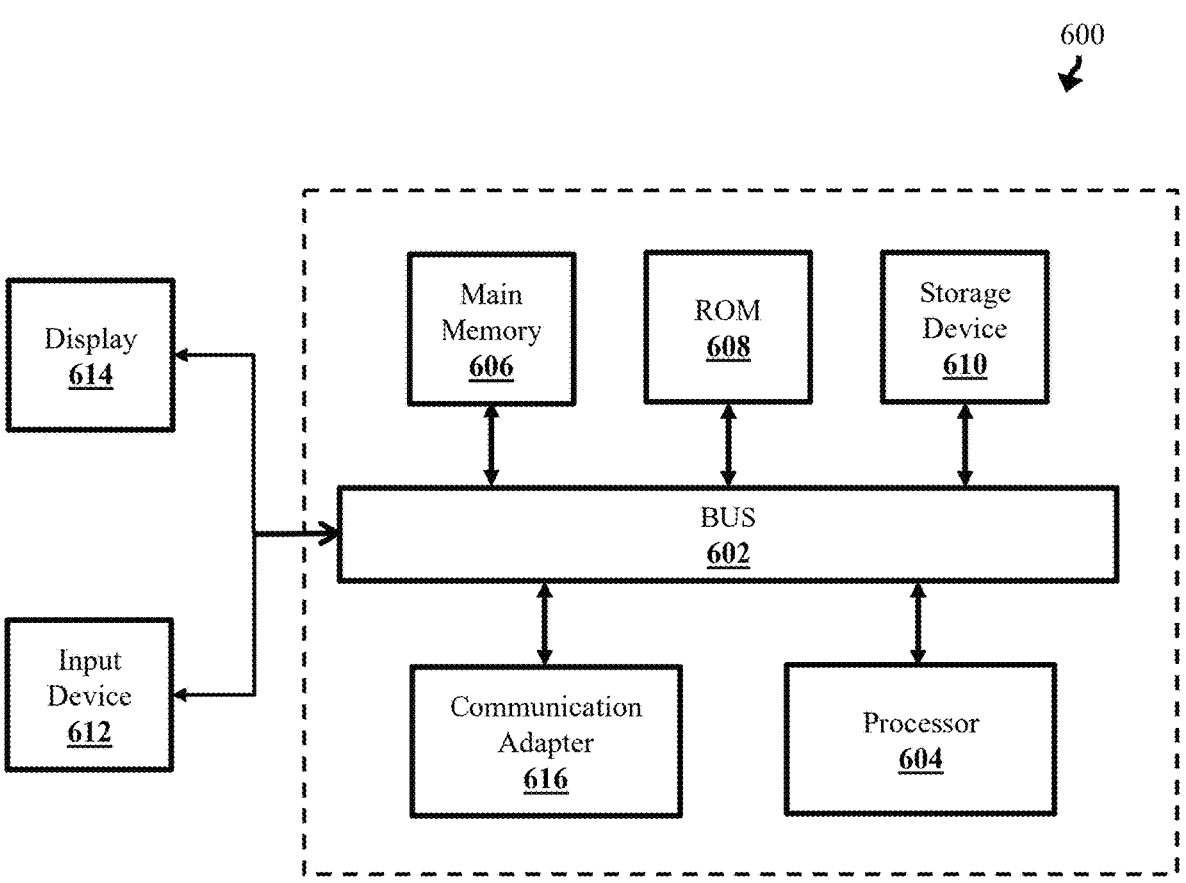
FIG. 6 illustrates a component diagram of a computing system suitable for use in the various implementations described herein, according to an embodiment.

FIG. 6 is a component diagram of an example computing infrastructure suitable for use in the various implementations described herein, according to an example implementation. One or more steps of the methods and processes discussed herein can be performed by the computing infrastructure depicted in FIG. 6.

The computing infrastructure 600 includes a bus 602 or other communication component for communicating information and a processor 604 coupled to the bus 602 for processing information. The computing infrastructure 600 also includes a main memory 606, such as a RAM or other dynamic storage device, coupled to the bus 602 for storing information, and instructions to be executed by the processor 604. Main memory 606 can also be used for storing position information, temporary variables, or other intermediate information during execution of instructions by the processor 604. The computing infrastructure 600 may further include a ROM 608 or other static storage device coupled to the bus 602 for storing static information and instructions for the processor 604. A storage device 655, such as a solid-state device, magnetic disk, or optical disk, is coupled to the bus 602 for persistently storing information and instructions.

The computing infrastructure 600 may be coupled via the bus 602 to a display 614, such as a liquid crystal display, or active matrix display, for displaying information to a user. An input device 612, such as a keyboard including alphanumeric and other keys, may be coupled to the bus 602 for communicating information, and command selections to the processor 604. In another implementation, the input device 612 has a touchscreen display. The input device 612 can include any type of biometric sensor, or a cursor control, such as a mouse, a trackball, or cursor direction keys, for communicating direction information and command selections to the processor 504 and for controlling cursor movement on the display 614.

In some implementations, the computing infrastructure 600 may include a communications adapter 616, such as a networking adapter. Communications adapter 616 may be coupled to bus 602 and may be configured to enable communications with a computing or communications network or other computing infrastructures. In various illustrative implementations, any type of networking configuration may be achieved using communications adapter 616, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing infrastructure 500 in response to the processor 604 executing an implementation of instructions contained in main memory 606. Such instructions can be read into main memory 606 from another computer-readable medium, such as the storage device 610. Execution of the implementation of instructions contained in main memory 606 causes the computing infrastructure 600 to perform the illustrative processes described herein. One or more processors in a multi-processing implementation may also be employed to execute the instructions contained in the main memory 606. In alternative implementations, hard-wired circuitry may be used in place of or in combination with software instructions to implement illustrative implementations. Thus, implementations are not limited to any specific combination of hardware circuitry and software.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system for enabling dynamic response of pre-existing models via dynamic modification of model thresholds in connection with performance drops, the system comprising:
   one or more processors and memory storing instructions that, when executed by the one or more processors, cause operations comprising:
      execute a malicious activity prediction model, an operation failure prediction model, and a testing activity prediction model for processing network operations obtained via one or more data feeds,
         wherein the malicious activity prediction model is configured to determine a first likelihood that a network operation corresponds to malicious activity and generate a malicious activity indication when the first likelihood satisfies a first threshold, wherein the operation failure prediction model is configured to determine a second likelihood that the network operation corresponds to a failure and generate a failure indication when the second likelihood satisfies a second threshold, and wherein the testing activity prediction model is configured to determine a third likelihood that the network operation corresponds to a testing activity and generate a testing indication when the third likelihood satisfies a third threshold; and in response to determining that a recall value for a computing infrastructure of a set of computing infrastructures fails to satisfy a recall threshold associated with the computing infrastructure in connection with processing the network operations:

execute a function-generation machine learning model to predict a threshold modification function to be applied to the first, second, or third threshold; and in connection with processing a first network operation for the computing infrastructure via the malicious activity prediction model, the operation failure prediction model, and the testing activity prediction model, dynamically revise the first, second, or third threshold in accordance with the threshold modification function.

2. The system of claim 1, wherein the one or more processors are further configured to:

train the function-generation machine learning model to predict the threshold modification function using a training dataset comprising historical network operations associated with at least one computing infrastructure.

3. The system of claim 1, wherein the function-generation machine learning model is trained to predict the threshold modification function corresponding to a timestamp associated with the network operation.

4. The system of claim 1, wherein the function-generation machine learning model is trained to predict the threshold modification function corresponding to one or more network operations clustered in accordance with a likelihood of similarity in at least one attribute.

5. The system of claim 1, wherein the one or more processors are configured to:

execute the function-generation machine learning model to predict the threshold modification function to be applied to the first, second, or third threshold; and dynamically revise the first, second, or third threshold of the malicious activity prediction, operation failure prediction, or testing activity prediction model in accordance with the threshold modification function in connection with processing the first network operation for the computing infrastructure via the malicious activity prediction, operation failure prediction model, and testing activity prediction models.

6. The system of claim 1, wherein the malicious activity prediction model is configured to determine the first likelihood of a first one of the network operation corresponding to the malicious activity, the failure, or the testing activity, the operation failure prediction model is configured to determine the second likelihood of a different one of the network operation corresponding to the malicious activity, the failure, or the testing activity, and the testing activity prediction model is configured to determine the third likelihood of a different one of the network operation corresponding to the malicious activity, the failure, or the testing activity.

7. A method comprising:

executing, by one or more processors, a first prediction model and a second prediction model for processing network operations obtained via one or more data feeds, wherein the first prediction model is configured to determine a first likelihood that a network operation corresponds to a first label and generate an indication of the first label when the first likelihood satisfies a first threshold, and the second prediction model is configured to determine a second likelihood that the network operation corresponds to a second label and generate an indication of the second label when the second likelihood satisfies a second threshold;

in connection with processing the network operations, determining, by one or more processors, that performance data for a computing infrastructure of a set of computing infrastructures fails to satisfy a performance threshold associated with the computing infrastructure; and in response to a determination that the performance data fails to satisfy the performance threshold associated with the computing infrastructure:

executing, one or more processors, a machine learning model to predict a threshold modification to be applied to the first or second threshold; and in connection with processing a first network operation for the computing infrastructure via the first and second models, dynamically revising, by one or more processors, the first or second threshold of the first or second prediction model in accordance with the threshold modification.

8. The method of claim 7, further comprising:

training, by one or more processors, the machine learning model to predict the threshold modification function using a training dataset comprising historical network operations associated with at least one computing infrastructure.

9. The method of claim 7, wherein the machine learning model is trained to predict the threshold modification corresponding to a timestamp associated with the network operation.

10. The method of claim 7, wherein the machine learning model is trained to predict the threshold modification corresponding to one or more network operations clustered in accordance with a likelihood of similarity in at least one attribute.

11. The method of claim 7, wherein the machine learning model is trained to predict the threshold modification corresponding to an operational parameter of the computing infrastructure.

12. The method of claim 7, wherein:

executing the machine learning model to predict the threshold modification comprises executing the machine learning model to predict a threshold modification function to be applied to the first or second threshold; and dynamically revising the first or second threshold of the first or second prediction model comprises dynamically revising the first or second threshold of the first or second prediction model in accordance with the threshold modification function in connection with processing the first network operation for the computing infrastructure via the first and second models.

13. The method of claim 7, wherein the first model is configured to determine the first likelihood of a first one of the network operation corresponding to malicious activity, failure, or the network operation corresponding to a testing activity, and wherein the second model is configured to determine the second likelihood of a different one of the network operation corresponding to malicious activity, failure, or the network operation corresponding to a testing activity.

14. A non-transitory machine-readable storage medium having computer-executable instructions stored thereon that, when executed by one or more processors, cause the one or more processors to:

> execute a first prediction model and a second prediction model for processing network operations obtained via one or more data feeds,
>> wherein the first prediction model is configured to determine a first likelihood that a network operation corresponds to a first label and generate an indication of the first label when the first likelihood satisfies a first threshold, and the second prediction model is configured to determine a second likelihood that the network operation corresponds to a second label and generate an indication of the second label when the second likelihood satisfies a second threshold;
> in connection with processing the network operations, determine that performance data for a computing infrastructure of a set of computing infrastructures fails to satisfy a performance threshold associated with the computing infrastructure; and
> in response to a determination that the performance data fails to satisfy the performance threshold associated with the computing infrastructure:
>> execute a machine learning model to predict a threshold modification to be applied to the first or second threshold; and
>> in connection with processing a first network operation for the computing infrastructure via the first and second models, dynamically revise the first or second threshold of the first or second prediction model in accordance with the threshold modification.

15. The non-transitory machine-readable storage medium of claim 14, wherein the computer-executable instructions further cause the one or more processors to:

> train the machine learning model to predict the threshold modification function using a training dataset comprising historical network operations associated with at least one computing infrastructure.

16. The non-transitory machine-readable storage medium of claim 14, wherein the machine learning model is trained to predict the threshold modification corresponding to a timestamp associated with the network operation.

17. The non-transitory machine-readable storage medium of claim 14, wherein the machine learning model is trained to predict the threshold modification corresponding to one or more network operations clustered in accordance with a likelihood of similarity in at least one attribute.

18. The non-transitory machine-readable storage medium of claim 14, wherein the machine learning model is trained to predict the threshold modification corresponding to an operational parameter of the computing infrastructure.

19. The non-transitory machine-readable storage medium of claim 14, wherein:

> executing the machine learning model to predict the threshold modification comprises executing the machine learning model to predict a threshold modification function to be applied to the first or second threshold; and
> dynamically revising the first or second threshold of the first or second prediction model comprises dynamically revising the first or second threshold of the first or second prediction model in accordance with the threshold modification function in connection with processing the first network operation for the computing infrastructure via the first and second models.

20. The non-transitory machine-readable storage medium of claim 14, wherein the first model is configured to determine the first likelihood of a first one of the network operation corresponding to malicious activity, failure, or the network operation corresponding to a testing activity, and wherein the second model is configured to determine the second likelihood of a different one of the network operation corresponding to malicious activity, failure, or the network operation corresponding to a testing activity.

* * * * *